United States Patent [19]

Deffeyes

[11] 4,146,504
[45] Mar. 27, 1979

[54] POROUS POWDERS AND A METHOD FOR THEIR PREPARATION

[75] Inventor: Robert J. Deffeyes, Arlington, Tex.

[73] Assignee: Graham Magnetics Inc., Graham, Tex.

[21] Appl. No.: 509,467

[22] Filed: Sep. 26, 1974

[51] Int. Cl.² .......................... B01J 21/04; B01J 23/10; B01J 23/18; B01J 23/80

[52] U.S. Cl. ..................................... 252/472; 252/462; 252/466 J; 252/62.55; 75/0.5 AA; 75/0.5 AB; 148/105

[58] Field of Search ...................... 252/472, 62.55, 462, 252/466 J; 750/0.5 BA, 0.5 AA; 148/105

[56] References Cited

U.S. PATENT DOCUMENTS

| | | | |
|---|---|---|---|
| 2,040,782 | 5/1936 | Van Peski | 252/476 X |
| 3,190,748 | 6/1965 | Landgraf | 252/62.55 |
| 3,755,008 | 8/1973 | Ehrreich et al. | 75/0.5 BA |
| 3,773,693 | 11/1973 | Calcagno et al. | 252/476 X |
| 3,843,349 | 10/1974 | Ehrreich et al. | 75/0.5 BA |
| 3,855,016 | 12/1974 | Ehrreich et al. | 75/0.5 BA |
| 3,925,114 | 12/1975 | Takahashi et al. | 75/0.5 AA |

Primary Examiner—W. J. Shine
Attorney, Agent, or Firm—Robert A. Cesari; John F. McKenna

[57] ABSTRACT

Novel materials formed from powders of high porosity, usually characterized by high surface area and always with a very low bulk density, are disclosed. Metal-bearing powders of this type are found to be particularly useful as catalysts and in magnetic applications. Some such powders find use in reinforcement of resins. Also disclosed are novel procedures suitable for making such powders and novel processes and novel compositions in which these powders can be advantageously utilized.

25 Claims, 1 Drawing Figure

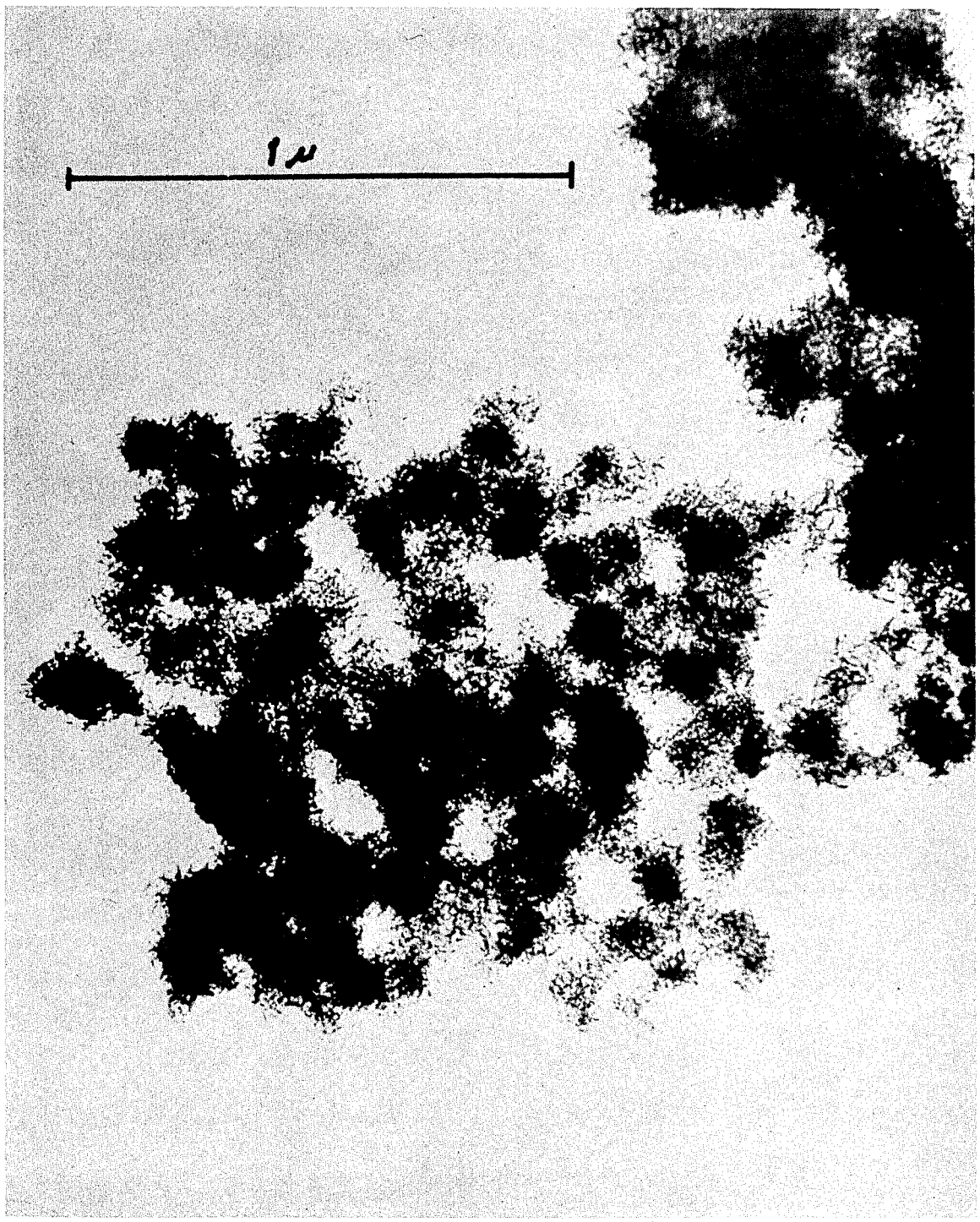

POROUS POWDERS AND A METHOD FOR THEIR PREPARATION

BACKGROUND OF THE INVENTION

There are many known procedures for producing small particles. Such particles find utility in numerous applications including those utilizing magnetic pigments, metallic catalysts, and reinforcing fillers such as, e.g., carbon black and pyrogenic silica.

Some of the more important work in the area of making such small particles was carried out by Ehrreich and Reti and is described in U.S. patent applications Ser. No. 228,387 filed on Feb. 22, 1972, now U.S. Pat. 3,892,673, and Ser. No. 367,461 filed on June 6, 1973, now U.S. Pat. 3,843,349. The Ehrreich-Reti work related to processes involving reduction of organometallic salts to form metal powders of improved magnetic properties. A number of other workers including Haines in U.S. Pat. 3,574,685 and Neel in U.S. Patent 2,651,105 also worked in this field and they, too, were primarily interested in the manufacture of magnetic materials.

Although the Ehrreich-Reti work provided an important advance in the art, there were still some drawbacks associated with the products made by their procedures. The inventions which are described below were made during investigations directed to making improved products according to the Ehrreich-Reti procedures.

Other prior work also is seen to relate to the present invention in view of the discoveries made during the evaluation of the novel products of the invention. This work is that generally relating to the fields of metallic catalysis, reinforcement of resins and polymer materials with reinforcing fillers. In general, problems are encountered in all of these fields providing small particles which meet such parameters as available pores of optimum size, surface area, available wetted surface, or other such requirements of various systems.

Therefore, it has been desirable to provide a versatile process for making powders, especially metal-bearing powders wherein one can achieve very small particles having a wide variety of atomic configurations, a high surface area, and, especially, a high porosity.

DEFINITION OF TERMS

"Metal-bearing powders" — Any material which incorporates any metal atoms arranged to form metal within the powder structure.

"Non-metallic powders" — These inorganic materials as defined herein also include metal atoms but do not comprise metallic material, e.g. the metal oxides are "non-metallic powders".

"Particle-size" — Applicants' process can produce powders having an elemental particle size, of the order of 0.01 microns in average diameter or even smaller. However, elemental particles are usually connected to form larger integral particles. Indeed one of the particularly advantageous aspects of the invention is the fact that such bundles of the particles occur naturally during processing and do so in such a way as to establish highly porous agglomerates. It is the size of these agglomerates that is usually referred to as "particle size" unless some statement is made to the contrary.

"Surface Area" — This will be measured by the standard Brunaur-Emmett-Teller (B.E.T.) nitrogen-absorption procedures.

"Bulk Density" — This is measured by filling a tared 50 ml graduated cylinder with the powder to be measured and tapping it lightly to settle the powder, and dividing the weight of the powder by the apparent volume thereof.

SUMMARY OF THE INVENTION

The products of the invention are small particles characterized by high porosity and structures or particles formed from said porous particles. Porosity is quantitatively measured by bulk density of the powder. The powders also tend to have a very high internal surface area. The internal surface area is suitably characterized by the nitrogen absorption method. In general, particles prepared according to the invention will be less than about five microns in average diameter. A particular advantage of the process of the invention is that particles of extremely small particle size can be prepared therewith. However, it is to be emphasized that in some applications (e.g. those wherein the powders are used to form a fixed bed through which fluids move) there is no criticality to particle size--the porosity surface area and bulk density characteristics are all-important. In many such applications the materials of the invention will be used as pellets or even sintered together lightly at points along the exterior surface thereof. On the other hand, if the particles are to be loaded into a polymeric matrix, particle size will be relatively important. In some important applications, e.g. where magnetic properties are important, it will be the magnetic particle size which will be important. Superparamagnetic elemental particles below 100 angstroms can dominate the magnetic characteristics of agglomerate particles far larger.

The novel materials subject of this invention are inorganic powders characterized by surface areas in excess of 5 square meters per gram, especially an effective pore size of from 25 to 200 angstroms in diameter and formed by the thermal decomposition of organometallic salts, e.g. metal oxalates, metal formates, and the like, so that the resultant products have a bulk density of less than 0.4 grams per cc when the specific gravity of the material from which the powders are formed is 8 grams per cc. In general, and in allowing for a range of materials of different specific gravity, the ratio between bulk density and specific gravity should be less than about 0.08 to 1, advantageously less than about 0.05 to 1. The most porous materials have such ratio below 0.02 and even as low as 0.002 and lower.

The most advantageous of the particulate materials have very high surface areas, i.e. over about 25 square meters per gram. This high surface area may be utilized directly as in catalysis. Lower surface area-material, say those between 5 and 25 meters$^2$ per gram may be advantageously utilized and indirectly as in facilitating comminuting the powder to a powder of reduced particle size, i.e. a powder approximating the elemental particle size.

DIFFERENTIATION OVER EHRREICH-RETI PROCESS

The powders of the invention advantageously utilize the general procedures described in the above-mentioned U.S. patent application Ser. No. 367,461 of Ehrreich-Reti. However, the Ehrreich-Reti technology must be modified in certain respects to achieve the degree of porosity and bulk density which characterize the powders of the invention. For example, Ehrreich and Reti used sodium salts in preparing their organometallic salt. A substantial amount of sodium remained occluded in the organometallic salt. This sodium remains in the reduced metal product and interfered substantially with the porosity thereof. Whether the effect is due to a fluxing action of sodium metal or its compounds is not known. But, the use of major quantities of such salts should be avoided in making metal-bearing powders of the invention.

Other factors which should be controlled to assure production of adequately porous powders are as follows:

(1) Avoid excessive compaction of the salt to be reduced. This, of course, includes the avoiding of vibration before reduction. Moreover, use of non-equant-shaped particles imparts a beneficially lower bulk density to the salt mass before reduction. This should not be taken to forbid pelletization of the salt even before decomposition when the process as a whole provides a suitably porous product.

(2) Utilize organometallic salts which contain a substantial amount of water of crystallization. For example, the cobalt oxalate, unless especially predried, will normally contain 2 molecules of such water per molecule of oxalate.

(3) Use a dry, organometallic salt, because an excessively damp surface tends to cause relatively tight packing of salt clumps and result in higher bulk density reduction products.

(4) Reduce the salt at relatively low temperatures, e.g. below about 750° F. in the case of metal oxalate salts which have 50% or more of the metal component as cobalt. In general, this helps minimize sintering. Reductions carried out with 10% or less hydrogen - 90% inert gas (e.g., nitrogen tend to facilitate maintaining the low temperature.

(5) In general, smaller particle sizes tend to allow production of lower bulk density powders.

Keeping these general parameters in mind, those skilled in the art should have no trouble in forming suitable products of the type disclosed herein.

Whatever the relative importance of these various steps, it is significant that the Ehrreich-Reti cobalt powders had bulk densities of 0.9 grams per cc or higher and had relatively little internal porosity compared to the products subject of the instant invention.

MAGNETIC MATERIALS

A number of surprising product advantages are achievable when one achieves lower bulk density powder. For example, it has been discovered, insofar as magnetic materials are concerned, that the magnetic particles formed by reduction of the organometallic salt can be subjected to comminuting with a relatively light mechanical action thereby achieving a desirable result with little or no disadvantageous effect on the magnetic properties of the material, e.g. no important increase in strain anisotropy. The particles so produced are dispersible in resin-based coating formulations for use in magnetic tape. It has been discovered that such particles exhibit a relatively low level of DC noise generation in such magnetic tapes. In general, magnetic properties are attained by this process which have not been achievable by any known process for making predominantly-cobalt particles.

In general, it is possible to disagglomerate metal particles formed by the present invention to a size wherein their DC saturation noise generation is reduced by 8 decibels.

In most cases, it is possible to keep most of this noise generation below 5 microns in wavelength. This can be achieved without ball milling, e.g. by processing the material for about two or three hours in a conventional sigma blade mixer.

Very substantial product advantages are also achieved with other metals besides ferromagnetic materials. For example, it is possible to produce metal catalysts having extremely high effective surface areas and in the form of extremely porous powders.

It has been found that when hydrogen and nitrogen content of the reducing gas is so balanced and maintained that a thermal equilibrium is maintained between the gas and the particles being reduced, the magnetic properties of the resulting metal particles are optimized.

It has been discovered that organic coatings on the organometallic salt, as those proposed by Ehrreich and Reti, do not interfere substantially with formation of the products of the invention; indeed, in most cases, such coatings facilitate formation of the products of the invention.

Nitrogen may be partially or wholly replaced with inert gases as krypton, xenon, helium, neon, argon and even carbon dioxide. Indeed helium with its greater thermal conductivity would probably be preferred for use were it not excessively expensive. Certain adjustments must be made when using such gases. For example, those gases having higher thermal conductivities will usually be used in proportionately smaller quantities because such higher conductivities, like helium has, will usually be used in proportionately smaller quantities because such higher conductivities tend to accelerate somewhat the hydrogen-induced exotherm.

In general, the particle beds including cobalt oxalates, will be maintained between about 580° F. and 750° F. Lower temperatures, generally below about 640° F. for cobalt-based particles, are desirable for magnetic materials which are to be subjected to subsequent comminuting. Hydrogen content of the reducing gas is desirably 5 to 40% within this temperature range. Lower hydrogen concentrations tend to permit making of magnetic powders having better coercivity and squareness.

In a cobalt oxalate reduction process, it has been established by differential thermal analysis (DTA) that a substantial exothermic reaction should be taken into account whenever the hydrogen content of $H_2$-$N_2$ mixture exceeds about 8%. The magnitude of the exotherm is relatively small until the hydrogen content is close to 80%.

Better magnetic properties are achieved in the 5–40% hydrogen range. The exact source of the exotherm is not known but probably is related to the reaction of hydrogen with an oxalate decomposition product. For example, some carbon dioxide product of the oxalate decomposition may be exothermically converted to methane.

It will be obvious to those skilled in the art on reading the above that it will be desirable to provide a highly gas-permeable organometallic salt powder material to the reducing oven and maintain good porosity throughout the reduction process. Indeed the permeability of the particles will advantageously exceed the permeability of gas through the particle-holding structure, thus the structure will act as a good gas distributor and channeling will be avoided.

Still further advantages are achieved when the process of the invention is coupled with the use of complexing agents as is described in U.S. Patent Application Ser. No. 401,636 filed on Sept. 28, 1974, now U.S. Pat. No. 3,909,240, by Deffeyes and Tyler. That application describes the use of complexing agents in the formation of the organometallic salt to improve the morphology of organometallic salts and, on reduction, the magnetic properties or resultant metal particles.

CATALYTIC MATERIALS

Among the more important particles found by the process of the invention are those which find use in catalytic applications. The importance of these catalytic particles derives from a large number of fortuitous characteristics of the particles:

(1.) Porosity: It appears that never before have such large internal surface area been available in metallic catalysts in such a form that pores of about 25 angstrom units to pores of the order of 200 angstrom units and higher are available for say, cracking of higher hydrocarbons into lower hydrocarbons. Most advantageous porous metal-bearing catalyst powders of the invention comprise pores of from 40 to 160 angstrom units in effective diameter.

(2.) Versatility: Applicants' powders may be formed in almost any combination of organometallic-salt-forming metals either by forming mixed-salt crystals which can result in different metallic atoms forming alloy powders or powders having an extremely-intimate combination of a plurality of metals, or by intimately mixing and reducing of crystals comprising different metals. Moreover, many metals can be reacted to form an "inert" catalyst carrier. Thus, for example, it is possible to produce nickel metal on a metal oxide-like alumina by thermally reducing a organo nickel salt and an organo aluminum salt mixture. Indeed, a particularly advantageous aspect of the invention is the formation of organometallic salts containing both the metal atom to be reduced and the metal atom to be oxidized within the same crystal. Thus, it is possible, not only to achieve relative quantities and positioning of different metals, but also possible to achieve such results between active-metal and inert-carrier components of a catalyst system.

(3.) Optimization: It is generally thought that the particularly advantageous catalytic properties of some metal catalysts depend largely on the electron density of the catalytic surfaces. For example, the elements platinum, nickel and palladium particularly favorable for many catalytic reactions. Applicant is not constrained by the limits of existing materials, but can form, either by alloying, or microspacing on inert carriers, the optimum catalytic surface constituted to provide the particular electron density required for a particular catalytic reaction.

(4.) Cobalt's Use in Improving Thermal Properties

It has been found that even relatively small well-distributed quantities of cobalt, say from about 5%, can be utilized in combination with other catalytic metal to substantially improve the performance of catalysts at higher temperatures, e.g. as occurs through crystallite growth through fusion.

(5.) Greater Stability of Catalysts In general, highly stable catalysts can be made by the present invention to replace the Raney-type materials and other such catalysts notorious for their short shelf life.

(6.) Oxide Structure It is believed that the oxides manufactured by the process of the invention have a particularly favorable crystalline structure which enhance their performance as catalysts. This is believed to be particularly true for alumina and for alumina formed from a mixed salt with a metal-forming cation therein.

(7.) Metallic dispersal The oxide forms a matrix for metallic material which is distributed as very small metallic masses. Indeed, the catalytic metal which is present within the same organometallic salt mass as the metal which is to form the oxide will form masses which are distributed within the oxide-metal catalyst, in approximately the same degree of intimacy in which they were present in the salt mass. The metal masses are advantageously so small that they are superparamagnetic in character, if ferromagnetic materials. Thus, they are below about 100 angstroms in size, depending on the particular metal or alloy.

REINFORCED RESIN COMPOSITIONS

The powders of the invention, as a consequence of their small particle size and porosity, exhibit a strong polymer-reinforcing action. This action is apparently due to the powders being (1) small; (2) having substantial "internal surface area" available to bond with polymer and thus being somewhat analagous to carbon black in this respect; and (3) being somewhat shaped as a "chain" and consequently having what is called "structure" in the polymer-reinforcing art, especially in the art relating to carbon black. Of course, reinforcing particles need not be metallic in nature. However, it is believed these materials greatly extend the spectrum of known polymer-reinforcing fillers.

MISCELLANEOUS UTILITIES

Metal powders of the invention have found utility as a metal target which can be successfully carried in an airstream, sensed by remote sensing means, to help characterize the flow path. For example, laser beams are used to track said particles using a Doppler effect. They can be used as filtration media either in a bulk-powder or partially fluxed state. They find utility as pigments for xerograhic and magnetic toners, inks and other such utilities. Also, the powders of the invention provide an excellent means for distributing the required trace elements over the cobalt-deficient soils such as exist in Australia and New Zealand. Current distribution methods from aircraft tends to result in excessively-localized stripes of the heavy metal along the ground.

The powders of the invention have some of the characteristics of molecular sieves. However, they have smaller, usually very much smaller, bulk densities than molecular sieves and have the further advantage of having much larger pore size, thereby facilitating the processing relatively high-molecular-weight-material. Indeed, whereas the molecular sieves are generally used to effect separations, the materials of the invention are primarily useful in allowing all gaseous material to pass therethrough, i.e. as when used in catalytic processing procedures.

Another aspect of the powders of the invention which has been found to be useful in their high resistance to compression and compaction in packed beds.

In carrying out the process of the invention, the following are typical of the kinds of organometallic salts which lend themselves to degradation to metals or metal oxides: formates, oxalates, phthalates, succinates, acetates, malonates and lower alkyl homologues. Oxalates are relatively inexpensive to make and have been the system of choice for most workers in this field, although some have suggested formates to be more desirable for some purposes.

Among the metals which are conveniently formed using the process of the invention are nickel, iron, cobalt, copper, ruthenium, platinum, palladium, rhodium, osmium, iridium, gold, silver, manganese, cadmium, tin, lead, indium, thalium, and the like. Other organometallic salts such as those of metals such as zinc, aluminum, cerium, magnesium, chromium, all of Group IIA, the rare earths, thorium, gallium and the like can be decomposed into oxide particles using the process of the invention.

It is to be understood that the salts of the invention can be formed to comprise a plurality of metals so as to form alloys of metals and, also, intimate combinations of metal and metal oxides.

While the present invention does not depend for its operability on the inventions described below, such inventions can be utilized, together or separately, in conjunction with the invention primarily defined herein. In general, optimum performance is achieved when the invention of this disclosure is carried out using one or more of the following procedures.

Coating of Ehrreich-Reti: This is a procedure whereby organometallic salts are coated with an organic film-forming resin before being subjected to thermal degradation. The organic material is advantageously in the range of from 1 to 15% by weight of the organic salt being reduced and any decomposition residue is preferably less than 5% of the metal content of the salt. Most desirable are polymers that liquify during the decomposition of the oxalate and before they reach their ultimate state of decomposition. Polyamides are particularly desirable for use with cobalt-bearing particles but polyurethane, epoxy and silicone coatings are illustrative of the broad spectrum of coatings that can be used.

Complexing procedure of Deffeyes-Tyler: This is a procedure whereby a complexing agent, perhaps through a rate-controlling or sterochemical phenomena, is used to initiate the precipitation or modify the growth of the organometallic salts.

Indeed, when used to produce acicular organometallic salts such as oxalates comprising a major portion of cobalt in the metal portion thereof, it has been found that the crystalline arrangement of the salt provides, upon suitable reduction to the metal, very substantial improvements in the magnetic properties of the metal. Surprisingly, the highly acicular properties of the initial precipitate (which we may call a seed) are transmitted to the organometallic salt grown from the seed and also to the metallic powder reduced from this organometallic salt. This appears in the first instance at least, due to growth of a fasces-like organometallic salt which can "splinter" on reduction. The improvements in ferromagnetic metal powders include extremely high squareness ratio of the hysteresis loop, and low DC noise, and high magnetic output from tapes produced therefrom. Such metal particles, when compared to their counterparts formed by the most favorable prior art procedures, also exhibit improved chemical stability; improved switching fields characteristics; improved coercive force, sigma value and squareness as a combination of properties; and an important improvement in the temperature dependence of the coercive force. The latter improvement is believed to be caused by the relative dominance of shape anisotropy over crystalline anisotropy.

In one embodiment of that invention, the initial precipitation of seed crystals takes place in the same medium in which the primary growth of organometallic salt is to occur. In such a situation, it is usually desirable to utilize a liquid medium wherein the solubility of the organometallic salt is less than its solubility in water. This is conveniently achieved by adding an organic solvent to the water. Such water-soluble solvents as acetone, lower alkyl alcohols like ethanol, and the like, are entirely satisfactory, and those skilled in the art can select many other such readily-available solvents for use if they wish to do so.

In another embodiment of that invention, seed crystals may be formed in a first medium containing the complexing agent and, advantageously, a water-solvent medium and then transferred to the primary crystal-growing solution. One advantage of this latter procedure is that, when the complexing agent is properly selected, the population density of seeds or seed-promoting complexes in the first medium can be so high that a very small volume of the medium containing the seeds or seed-promoting complex can be used to initiate the growth of crystals in the primary crystal-growing solution. This is true even when the medium for the primary crystal-growing step is entirely aqueous. Thus, it is seen that this embodiment of the invention can be carried out using a relatively small amount of organic solvent and complexing agent It is possible, of course, for the complexing agent to act as a solubility-limiting material also. Indeed ethylene glycol is illustrative of one compound that is advantageously utilized in such a dual role.

The term complexing agent herein is used to cover chemical compounds which associate with metal ions in the reaction solution. Cobalt's tendency to form such associations is well known. The association may be via coordinate bonds, hydrogen bonds, or other such forces; the resulting compound may be looked at as a coordination complex, a chelate or more particularly described by some other terminology. Among the useful complexing agents are organic compounds such as polyhydroxy compounds including sugars, hydroxy carboxylic acids, dicarboxylic acids, and the like. The amino and hydroxy carboxylic acids advantageously have an amine or hydroxyl group adjacent the carboxy group. Inorganic compounds can also be used. Those bearing the ammonium ion are easily utilized in suitable complex formation. For the purposes of the invention the particular metal complex should at least partly be dissociable in the reaction medium. There would be no point in permanently sequestering the metal to prevent its mobility to the embryonic seed crystal, nor would there by any point in dropping the metal out of solution in an insoluble complex precipitate. On the other hand, if the complex is so readily dissociable in the particular medium in which it is used that only an inoperable complex is existant, then the complexing agent or the medium must be changed to make the complexing agent useful. These considerations will be obvious to chemists reading this disclosure. However, they are made explicit here because of the physical impossibility of listing all of the solvent systems and complexing agents which could find use in the process of the invention.

Among complexing agents advantageously used are included such compounds as sugars, especially sugars like glucose, sucrose and the like; glycols such as ethylene glycol and the like; glycerine and the like. Dicarboxylic acid complexing agents, e.g. phthalic acid and the like, are also useful. Indeed, some of the more advantageous aliphatic complexing agents are such aliphatic acids as tartaric acid, citric acid and the like. Other such acids include glycolic, hydroxy lactones such as ascorbic acid, lactic, hydroxy-butyric, mandelic, glyceric, malic, and the like. Ethyl alpha hydroxy butyrate is believed to be another effective complexing agent as is ethylene diaminetetracetic acid. In general, the more advantageous organic complexing agents appear to be those with two or more hydroxy groups, two or more amino groups, a hydroxy group with an adjacent carboxyl group or an amino group with an adjacent carboxyl group. But other such sites can interact with a cobalt ion to form a complex as is known in the art. Using the above teachings, and the vast amount of pre-existing literature already known to the art and which relates to cobalt-complexing agents, it is expected all skilled in the art will be able to select many additional complexing agents; all such materials, including such sometimes "chelating" agents as diethylene triamine, and the like are intended to be covered by the term "complexing agent" as used in this application.

In many embodiments the use of complexes seems to result in a catalytic-like effect whereby reactions are promoted which do not take place, or take place relatively poorly, in the absence of the complex-promoted growth of seed crystals.

The cobalt-bearing organometallic salts formed of carboxylic acids by the aforesaid complex-utilizing seeding procedure are characterized by great acicularity. They tend to form in what appears to be elongate fasces which, on reduction to the metal, tend to splinter along the direction of the axis of the fasces and form elemental cobalt metal particles of a more highly acicular and ordered crystalline structure then has been achieved heretofore. Most important, it appears that this acicularity of shape also manifests itself in an improved dominance of shape anisotropy or crystalline anisotropy characteristics in magnetic behavior of the particles.

Anisotropy is the non uniformity, or directional dependence, of the magnetic properties. It is anisotropy that gives rise to the coercive force. Anisotropy can be caused by many different factors. In the kind of magnetic particles described herein, the dominant anisotropy factors are shape anisotropy and crystalline anisotropy. Shape anisotropy arises from the particle being unequal in length and diameter. Particles with high shape anisotropy are desirable because they can be oriented in a magnetic tape system and because their magnetic properties are not substantially influenced by changes in temperature. Crystalline anisotropy relates to anisotropies in the crystalline structure of the magnetic particle. The coercive force of a particle which derives its magnetic properties from crystalline anisotropy will change as about the 10th power of the absolute temperature. Thus, the crystalline anisotropy can be distinguished from shape anisotropy by measuring the coercive force at room temperature and at some reduced temperature. Measurements made at about 25° C. and at liquid nitrogen temperature reveal the products of that invention to have unusually stable magnetic properties over a broad range of temperatures.

Seeding Procedure of Deffeyes: In the foregoing discussion of complexing agents, it was pointed out that use of a seed crystal was advantageous. In the Deffeyes seeding process, claimed in a commonly owned and co-pending application Ser. No. 509,468 filed on even date herewith by Deffeyes, now U.S. Pat. No. 3,965,046 it is provided that a seed crystal of one material, say a having one characteristic (e.g., cobalt oxalate of a highly acicular nature) can be used as nuclei for another organometallic material to grow a finished crystal which, on decomposition, contributes properties to the metal-bearing product which are much enhanced over the properties that would have been obtained if the seed had not been used. Examples are highly acicular nickel-bearing powders which are made possible by use of acicular cobalt-bearing seed, equant cobalt-bearing powders made possible by use of an equant copper-bearing seed, etc. It is not only the shape of the particles that seems to respond to the seeding; improved combinations of magnetic and chemical properties achievable by the process are not believed to be readily explained by relevant prior art.

In general, the inorganic particles formed according to the invention appear to be active in, at least, those catalytic applications in which they are now known for use. For example, these various fields of catalysis include:

| | |
|---|---|
| alkylation | ammonia dissociation |
| ammonia synthesis | cyclization of organic compound |
| dehydration or hydration processes | dehydrogenation |
| denitrogenation | desulfurization |
| esterification | halogenation |
| hydroalkylation | hydrocracking |
| hydrogenation and hydrogenolysis | interesterification |
| isomerization | oxidation |
| oxo-process catalysis | organic synthesis |
| reforming of hydrocarbons | saturation of aromatics |

Catalysts of all the following kinds are suitable prepared according to the invention: (element-to-element references are to the Periodic Table)

Ag-to-Ba as active components
Cobalt/Cobalt molybdenum as active component
Chromium on an alumina cover
Copper chromite as active component
Copper as active component
Fe-to-Na as active component
Nickel tungsten as active component
Pd-to-An as active component The most usual benefits contributed by catalysts prepared according to the present invention are large surface area, ability to treat large molecules, improved stability during use. Other benefits include a broader range of catalytic activity and improved yields of products.

ILLUSTRATIVE EXAMPLES OF THE INVENTION

It is, of course, to be understood that the following examples are intended to be illustrative and that numerous changes can be made in the reactants, proportions, and conditions set forth therein without departing from the spirit of the invention as defined in the appended claims.

Example 1 — Aluminium Oxide Powder

A first solution was prepared as follows:

|  | grams |
|---|---|
| oxalic acid dihydrate | 84 |
| water | 800 |

The pH of the solution was adjusted with sodium hydroxide until it was 10.

To this first solution was added a second solution consisting of

|  | grams |
|---|---|
| $Al_2(SO_4)_3 \cdot 18 H_2O$ | 200 |
| Water | 400 |

The two solutions were combined by dropwise addition of the latter to the former in a baffled 1500 ml Erlenmeyer flask with agitation supplied by a conventional magnetically-coupled agitating bar.

The pH was monitored and maintained above 10 throughout this run by addition of NaOH. A resulting precipitate was filtered, washed with dilute caustic soda (pH of about 12), and dried.

The sample was placed in a tube furnace and fired at 600° F. in a 5%-hydrogen, 95%-nitrogen mixture at a gas flow rate of 2.4 liters per minute for 2 hours. The resulting aluminium oxide precipitate was cooled in nitrogen and removed. The following properties were measured Surface area: 168 meters$^2$ per gram
Bulk density: 0.3 grams per cc.
Oil Absorption: 1.8 ml per gram of oxide The oil absorption was obtained using a standard test, i.e. Cabot Corporation Test No. 24, a procedure dated 2/28/64. The test is commonly used in the paint and pigment industry for carbon black and other such particulate material.

The surface area stability of the oxide was tested in the same oven as was used for form the oxide. The gas flow was 2400 ml per minute and consisted of 20:80 hydrogen-to-nitrogen mixture. After two hours at 800° F. surface area did not change significantly.

Example 2 — Nickel-Aluminum Oxide Powder

A first solution was prepared in a baffled one liter Erlenmeyer flask as follows:

oxalic acid dihydrate: 25.2 grams
water: 400 grams

The pH was maintained above 10 by the addition of sodium hydroxide solution.

A second solution was formed containing

|  | grams |
|---|---|
| nickel nitrate hexahydrate | 23 |
| $Al(NO_3)_3 \cdot 9H_2O$ | 7.5 |
| Water | 200 |

The second solution was added dropwise to the first solution. The pH was monitored and adjusted to about 10 by addition of caustic solution. The precipitate resulting from this addition was filtered, washed with dilute caustic (pH12) and dried. This material was reduced to a highly porous powder containing, quantitatively, nickel metal and aluminium oxide. The reduction was at 600° F. in a 5:95 $H_2$ to $N_2$ atmosphere at a flow rate of 2500 ml per minute. After being cooled to about 80° F. in nitrogen, the sample was exposed to a 3% oxygen-in nitrogen mixture for 3 hours, then to dry air for another three hours before being recovered and analyzed.

The surface area was 117 square meters per gram. On being subjected to the thermal stability test of Example 1, the area was reduced to about 75% of this value.

The drawing is a photograph of this material at 100,000 magnification.

Example 3 — Nickel Metal Powder

A solution was made containing 29.0 grams of nickel nitrate hexahydrate in 200 ml water. A second solution, comprising 25.2 grams of oxalic acid in 400 ml of water, was added dropwise with stirring. Nickel oxalate was precipitated, filtered and washed with water, then with isopropanal. It was dried and fired at 600° F. (in 5% $H_2$; 95% $N_2$) until the $CO_2$ level in the exit gas was below 0.02%. The sample was cooled to room temperature and exposed to 3% $O_2$ in $N_2$ for 3 hours and, then, to air for another hour.

The B.E.T. surface area of the resultant nickel powder was 19 meters$^2$ per gram before a surface area stability test but only 0.2 meters$^2$ per gram thereafter.

These first three Examples illustrate the advantage of the applicant's process for microsupporting catalytic metal on a non-metallic support. Considerable enhancement of metallic surface area stability is achieved at elevated temperatures.

The following examples illustrate further examples of powders prepared according to the invention. In each case, the metal and metal oxide is formed by thermal decomposition of the appropriate oxalate salt as is generally taught in Examples 2 and 3 above.

Example 4

The work of Example 2 is repeated except that $K_2CO_3$ used to adjust pH, and the nickel:aluminum ratio was 20:80 Surface area of the resulting microsupported nickel on alumina was 143 m$^2$ per gram. The material was tested and found to be a useful catalyst for hydrogenation of ethyl cinnamate.

Example 5

The work of Example 2 was repeated but adjusting the nickel:aluminum ratio to 10:90. Surface area of the resulting material was 226 meters$^2$ per gram.

Example 6

Example 4 was repeated except that the aluminum was replaced with magnesium as magnesium chloride, and no pH adjustment was utilized.

The resulting magnesium-nickel oxalate was fired at 5% $H_2$ and 95% $N_2$ at 600° F. until the $CO_2$ evolution dropped to less than 0.02% of volume of the off gas. Then the hydrogen was increased to 20% at 850° F. for an additional half hour. After cooling, the surface area of the particles was measured to be about 150 meters$^2$ per gram. The highly porous product comprised extremely finely divided nickel on a magnesia support. This material was also found to be an effective catalytic agent for hydrogenation.

Example 7

An oxalate was precipitated according to the general procedure of Example 6 but with $Ce_3(NO_3)_2$ as the source of the oxide metal.

The resulting oxalate was fired in 5% $H_2$ and 95% $N_2$ at 750° F. to produce a porous powder containing nickel intimately dispersed within a ceria support.

The powder was measured to have a surface area of 20. It was found to catalytically active for hydrogenation.

Example 8

An oxalate comprising 40% nickel and 60% zinc was formed according to the general procedures outlined above. $ZnCl_2$ was used as the source of zinc in preparing the necessary solutions.

The resulting oxalate was filtered, washed, and fired at 700° F. (in 5% $H_2$, 95% $N_2$). The surface of the resulting nickel-zinc oxide powder was 24 meters$^2$ per gram.

Example 9

Example 8 was repeated with reactants selected to yield a 20% nickel-80% zinc powder. Again the zinc was present as the oxide with the nickel intimately dispersed therewith. Surface area was 23 meters$^2$ per gram. The material was checked and found to have catalytic activity.

Example 10

Using the same general technique described in Example 4, an oxalate was prepared but a proportion of the aluminum salt was replaced with magnesium salt so that the final material would have the following metal ratios: nickel 25, magnesium 25, aluminum 50

The oxalate was filtered and washed, fired in 5% $H_2$, 95% $N_2$ at 850° F. The surface area was 58 meters$^2$ per gram. The product, a porous powder of nickel intimately supported on magnesia/alumina support, was catalytically active.

Example 11

A first solution was prepared by dissolving 33 grams of aluminum sulfate in 100 grams of water. This first solution was added slowly to a second solution containing 25 grams of oxalic acid in 300 ml of water. A quantity of 0.2 moles $K_2CO_3$ in water was then added slowly to oxalic-bearing mix. The resulting mix was cooled at 10° C. and may be considered a seed crystal mix.

Then a third solution, one comprising 33 grams of aluminum sulfate in 150 ml of water, was prepared and also chilled to 10° C. One gram of palladium chloride was added to this chilled material. Thereupon this palladium-bearing material was added slowly to the seed-bearing mix. Enough potassium carbonate was added to maintain a basic solution. The resultant reaction mix is allowed to come to room temperature and then stirred for about 30 minutes before the precipitate is recovered, washed, filtered and fired.

The precipitate, a mixed oxalate of palladium and aluminum was fired in 5% $H_2$ and 95% $N_2$ at 750° F. until the $CO_2$ level dropped to 0.02% of the off gas hours. After cooling, washing and filtering an extremely porous powder formed of palladium on alumina was obtained.

The product was found to be catalytically-active and had a surface area of 218 meters$^2$ per gram.

Example 12

This example (and Examples 13 and 14) describe a catalyst having particular value in conversion of carbonaceous materials, e.g. coal to hydrocarbon fuel gases. A particularly valuable aspect of the catalyst is its ability to produce a relatively large quantity of ethane.

The catalyst was prepared as follows: A first solution was formed of 3200 ml of a cobalt nitrate solution (aqueous) containing 15% cobalt by weight; 7300 grams of citric acid; 1740 mls of 67% sucrose solution (aqueous); 3306 ml of deionized water; and 2884 ml of denatured ethyl alcohol.

A second solution was made of 2328 grams of oxalic acid dihydrate in 5220 ml of 67% sucrose solution; 6920 ml of deionized water and 8720 ml of denatured alcohol.

These two solutions were pumped at rates of 230 ml/minute and 345 ml/minute, respectively, into a ⅛-inch stainless steel "T" coupling and through seven feet of ¼-inch (i.d.) tubing into a receptacle. A very thick pink dispersion of cobalt oxalate crystals resulted. This dispersion will be called a "seed" mixture.

Thereupon an iron-bearing solution was prepared by dissolving 6.25 lbs of ferrous sulfate crystals, containing 20.09% by weight of iron in 101 lbs of water, with 0.5 lb of citric acid 10 grams of sodium sulfite.

A metal-bearing solution was then prepared containing 12 lbs of cobalt nitrate solution (15% cobalt by weight); 7.125 lbs of nickel nitrate solution, containing 12% weight % of nickel; 53 lbs of iron-bearing solution as described above and 93 lbs of water.

An oxalic acid solution was prepared by dissolving 16 lbs of oxalic acid dihydrate in 270 lbs of water. When solution of the oxalic acid was complete the seed solution was added thereto.

The metal solution is sprayed, at a rate of 3.7 gallons per hour, into a baffled and very-well-agitated mixer holding the seed dispersion. After the precipitation has been completed, it is filtered in a pressure filter, and the cake washed with 50 gallons of hot (70° C.) water. Nitrogen forces excess water from the filter cake. The cake is then washed with 15 gallons of isopropanol (IPA). Excess IPA is removed by passing nitrogen through the filter cake. The cake is removed from the filter and slurried with one pound nine ounces of polyamide resin solution containing 25% by weight of solids. The material is spray dried in a Bowen Engineering dryer at 200° F. inlet air temperature and about 0.5 volume percent isopropanol in the vapor. A sample of this dry powder weighing 30 grams was charged into a tube furnace. It was reduced to metal in an atmosphere containing 5% hydrogen, 600° F., until the $CO_2$ and water in the vent gas were less than 0.02% by volume. The gas flow rate was set at 2.5 liters per minute. The tube was then cooled to room temperature with a 0.2 liter per minute nitrogen flow. Next 3% $O_2$ in 97% $N_2$ is added at a low flow rate. After 3 hours, the tube is purged with dry air for one hour and opened.

The powder was analyzed for its magnetic and physical properties.

Surface area was measured by the $N_2$ adsorption method of Brunauer Emmet and Teller (B.E.T.) and found to be 61 square meters per gram.

The specific magnetic moment was measured by a vibrating sample magnetometer at 5000 oersteds applied magnetic field and found to be 167 emu/gram.

The coercive force and squareness were measured on a 60 cycle magnetic loop tester, or BH meter. At 3000 oe applied magnetic field, the coercive force was found to be 753 oe. At 1500 oe applied magnetic field, the squareness was found to be 0.83. Both BH values are for the sample dispersed in linseed oil, 3 ml of oil being used per gram or powder.

The bulk density was measured by dumping 50 ml of powder into a tared graduated cylinder. The powder was found to weigh 6.000 grams, or 0.12 grams/ml.

The particle density was found by a Beckman air comparison pycnometer to be 7.7 grams/cc. The sample was dried under helium gas at 170° F. for 6 hours. The sample was then transferred into a $N_2$ filled glove box containing the pycnometer. The measurement was made in dry pure nitrogen gas to avoid absorption errors.

A second tube furnace run was made the same as the first run, but dumped into Freon TF prior to catalyst testing.

Example 13

A first solution was prepared containing 174 grams of nickel nitrate hexahydrate, 200 ml of water and 200 ml of denatured ethanol. This solution was added dropwise to a 1000 ml Erlenmeyer flask with four stirring baffles equipped with a magnetic stirrer. The flask contained a solution of 126 grams oxalic acid dihydrate in 400 ml water and 400 ml denatured ethyl alcohol. The precipitate was filtered on a Buchner funnel, washed with 400 ml hot water, and 200 ml isopropanol. This sample was dried, and fired in a tube furnace at 600° F. in a 2.5 liters/minute nitrogen flow. The sample was cooled to room temperature and exposed to 3% $O_2$ in $N_2$ for 3 hours, then to dry air for 1 hour. A porous nickel powder was obtained.

The surface area was measured by B.E.T. nitrogen absorption method and found to be 33 square meters per gram.

Example 14

This sample was handled identically as Example 13, except that the metal solution contained 174 grams of nickel nitrate hexahydrate and 26 g of cobalt nitrate hexahydrate. B.E.T. measurement showed 26 square meters/gram of surface area. The product was a 85% nickel - 15% cobalt powder.

Catalytic Properties of Material Produced by Examples 12-14

The powders of Examples 12-14 were tested as catalysts for the production of gaseous paraffins using a mixture comprising hydrogen and CO as feedstock.

|  | CO conversion % for Catalysts Examples at 380° C. at 285 psi | | |
|---|---|---|---|
|  | 12 | 13 | 14 |
| Methane | 60-64 | 91-94 | 88-91 |
| Ethane | 22-27 | 0 | 0 |
| $CO_2$ | 12-15 | 6-8 | 9-12 |

With the catalyst of Example 14, ethane selectivities up to 9-11% and methane selectivities of about 70-73% were obtained as operating pressures increased to 400 psi.

Experimental Details of Catalyst Testing (Examples 12-14)

The Cobaloy products were packed for a distance of about one inch or less inside a stainless steel tube with an internal diameter of about 0.1 inches. The amount of granular solids used for packing varied from about 1.0 gram down to at least 0.16 grams (conversions of reactants were always high; even less catalyst can be used). Glass wool was used as support material to maintain the catalyst solids as a relatively compact bed on the tube reactor. Tests indicated that the reactor tube had little or no catalytic effects; all reactions are hence caused by the intended catalysts.

Means were provided on the experimental equipment, to provide either a mixture of carbon monoxide and hydrogen, pure hydrogen, or pure helium to the reactor or via a by-pass to gas chromatographic equipment. The hydrogen was used for activating the catalyst (or to determine, subsequently, if any carbon on the catalyst can be methanated). Helium was used to flush out the system as desired. The mixture of carbon monoxide and hydrogen in a ratio of 24.38/75.62 was the feedstock for the methanation runs. Flowrates and pressures were adjustable from about 10-60 cc/minutes and 0 to 400 psig respectively. The electrical power input to the furnace was adjusted to maintain furnace temperatures as indicated by the thermocouple (wired to the outside of the reactor tube) at any desired temperature in the 300° to 400° C. range.

The gas chromatographic equipment was designed to separate hydrogen, carbon monoxide, methane, carbon dioxide, ethane, and higher paraffins. The column material in the unit was also satisfactory for separating the water at lower concentrations. Since the water content of the product stream is relatively high at high conversions, the water was removed in all runs to date by means of the water condenser (cooled with ice) and in the drying tube (filled with a desiccant).

Flow rates of the gas streams were measured using a soap-bubble meter. The flow rates of the inlet gas to the reactor were measured by employing the by-pass line around the reactor. The product gas streams were measured after these streams were dried.

Based on the data obtained that generally included the flowrates of both the inlet and product gas streams, the composition of the inlet gas stream, and the composition of the dried product stream, calculations were made to determine:

(a) Selectivities of conversions of carbon monoxide to methane, ethane and carbon dioxide.

(b) Material balance based on carbon atoms in and out.

(c) Material balance based on hydrogen atoms. Since the water content of the exit gas was not measured directly, the water content was approximated assuming first a perfect oxygen balance.

Before methanation was attempted, most catalysts were first activated with hydrogen for at least half an hour at about 250° to 400° C.

In general, it may be concluded that:

(a) The catalysts are highly active and high conversions (about 90% or greater) of reactants resulted.

(b) Ethane production was much greater in runs with catalysts containing cobalt than with pure nickel catalysts. Yet pure nickel catalysts have heretofore been considered most promising for methanation.

The predominant reactions occurring with these catalysts tested are apparently:

$$CO + 3H_2 \rightarrow CH_4 + H_2O \quad \text{(I)}$$

$$2CO + 5H_2 \rightarrow C_2H_6 + 2H_2O \quad \text{(II)}$$

$$CO + H_2O \rightarrow CO_2 + H_2 \qquad (III)$$

The good material balances obtained in this investigation strongly suggest that Reaction III is the main reaction causing carbon dioxide formation and that a Reaction IV is of little significance.

$$2CO \rightarrow C(coke) + CO_2 \qquad (IV)$$

Example 15

Solutions were prepared of
(1) 25.2 grams of oxalic acid dihydrate and 400 ml water; and (2) 29.92 grams of cobalt nitrate in 200 ml of water.

The cobalt-bearing solution was added slowly to the oxalic acid solution, and the resulting precipitate was recovered, washed with isopropanol and fired at 600° F. in 5% $H_2$ and 95% $N_2$ until the $CO_2$ was less than 0.2% of the total off gas.

The bulk density of the resulting cobalt powder is 0.34 grams per cc. The surface area was 39 $m^2/g$.

Example 16

Example 15 was repeated using nickel nitrate instead of cobalt nitrate. The resulting nickel powder had a bulk density of 0.38 grams per cc and a surface area of 19 $m^2$ per gram.

Examples 15 and 16 illustrate that, by keeping the reduction conditions mild enough, i.e. relatively low in temperature and hydrogen, it is possible to produce metal powders within the broadest scope of the invention without using seeding or complexing procedures, and indeed, without using the advantageous organic coating technique developed by Ehrreich and Reti.

Example 17

A material was prepared as follows: A first solution was formed of 4 lbs of a cobalt nitrate solution (aqueous) containing 15% cobalt by weight; 7 lbs, 13.5 ounces of citric acid; 2 lbs, 7 ounces of a 67% sucrose solution (aqueous); 3 lbs, 10 ounces of deionized water; and 2 lbs, 2 ounces of denatured ethyl alcohol.

A second solution was formed of 2 lbs of 8 oz. of oxalic acid dihydrate in 7 lbs, 4 ounces of 67% sucrose solution; 7 lbs 4 ounces deionized water and 7 lbs, 4 ounces of denatured alcohol.

These two solutions were pumped at rates of 230 ml/minute and 345 ml/minute, respectively, into a ⅛-inch stainless steel "T" coupling and through seven feet of ¼-inch (i.d) tubing into a receptacle. A very thick pink dispersion of cobalt oxalate crystals resulted. This dispersion will be called a "seed" mixture.

Thereupon 53 lbs of an iron-bearing solution was prepared by dissolving 12.5 parts $FeSO_4$, 194 parts of water, 0.5 parts of citric acid, and 3 grams of sodium sulfite.

A metal-bearing solution was then prepared containing 16 lbs of cobalt nitrate solution (15% cobalt by weight); 8 lbs 6 ounces of nickel nitrate solution, containing 10.2% weight of nickel; 53 lbs of iron-bearing solution as described above and 93 lbs of water.

An oxalic acid solution was prepared by dissolving 17 lbs 8 ounces of oxalic acid dihydrate in 270 lbs of water. When solution of the oxalic acid solution was complete, the seed solution was added to it and mixed in.

The metal solution is sprayed, at a rate of 3.7 gallons per hour, into a baffled and very-well-agitated mixer holding the seed dispersion. After the precipitation has been completed the resulting oxalate crystals were stirred for an additional 30 minutes and then filtered, washed with 50 gallons of hot water then 15 gallons of ethanol. The crystals were then coated, from isopropanol, with 7% of polyamide resin (e.g. a material sold by AZ Products Company of Eaton Park, Florida, under the trademark Azamide 325) based on the weight of metal in the oxalate, dried. This material was divided into a large number of samples, reduced under a several sets of firing conditions and evaluated for a number of properties.

The date presented below shows how various properties of the metal changed with respect to reducing conditions. In this data:

$H_9$ = Coercivity of the powder
SA = Surface Area (BET)
Sq = Squareness
Ms = Magnetic moment in oersteds
Oa = linseed oil absorption (cc per grams)
Wr = In a hysteresis loop showing an unintegrated value of the magnetic moment with time (a dM/dt curve), the peak-spread width at 50% of the peak height over the distance from origin of the curve to a vertical line from the center of the peak.

Reduction was carried out until the $CO_2$ level in the off gas fell below 0.02%.

Table 17

| EX | % $H_2$/TF | $H_c$ | SA | Sq | Mg | Wr | OA | B.D. |
|---|---|---|---|---|---|---|---|---|
| 17-1 | 0/700 | 760 | 34.7 | 0.82 | 192 | 0.55 | | 0.045 |
| 17-2 | 0/800 | 797 | — | 0.83 | 177 | — | | — |
| 17-3 | 5/600 | 765 | 70 | 0.59 | 169 | 1.38 | | 0.044 |
| 17-4 | 5/650 | 772 | — | 0.69 | 156 | 0.99 | | 0.043 |
| 17-5 | 5/700 | 850 | 43 | 0.78 | 191 | 0.70 | 1.4 | 0.06 |
| 17-6 | 5/750 | 834 | 29 | 0.77 | 163 | 0.61 | | 0.047 |
| 17-7 | 5/775 | 744 | 23 | 0.80 | 170 | 0.59 | | .063 |
| 17-8 | 5/800 | 747 | 39 | 0.80 | 166 | 0.65 | | |
| 17-9 | 10/800 | 686 | — | 0.77 | 180 | — | | |
| 17-10 | 20/650 | 887 | — | 0.71 | 173 | 0.82 | | 0.046 |
| 17-11 | 20/700 | 890 | — | 0.63 | — | — | | |
| 17-12 | 20/750 | 862 | — | 0.72 | 152 | 0.70 | | |
| 17-13 | 20/800 | 470 | 9 | 0.81 | 156 | 0.77 | | |
| 17-14 | 30/700 | 813 | — | 0.68 | 162 | 0.83 | | 0.055 |
| 17-15 | 30/750 | 538 | — | 0.84 | 170 | 0.59 | | |
| 17-16 | 30/800 | 442 | 9 | 0.83 | 149 | 0.90 | | |
| 17-17 | 40/650 | 850 | 24 | 0.69 | 167 | | | |
| 17-18 | 40/700 | 833 | 12 | 0.76 | 171 | 0.52 | | |
| 17-19 | 40/750 | 507 | 7.0 | 0.81 | 151 | 0.65 | 1.1 | |
| 17-20 | 40/775 | 462 | 3.2 | 0.82 | 164 | 0.76 | | |
| 17-21 | 40/800 | 353 | 2.5 | 0.82 | 159 | | | |
| 17-22 | 5/850 | 756 | 37 | 0.77 | 200 | 0.66 | | 0.05 |
| 17-23 | 40/725 | 793 | 24 | 0.72 | 162 | 0.69 | 0.8 | 0.067 |
| 17-24 | 40/850 | — | 4.4 | — | — | — | 1.46 | 0.11 |
| 17-25 | 50/750 | — | 5.3 | — | — | — | | 0.078 |

Example 18

Example 7 is repeated using, instead of cerium salt, commercially-available salt of mixed rare earths. The resultant material, catalytically active, will be less expensive than the cerica-type support.

Example 19

Example 7 is repeated using, instead of a cerium salt, calcium chloride. The resultant organometallic salt is fired at 850° F. (40% $H_2$ and 60% $N_2$) for 2 hours. The resultant calcium-oxide and nickel powder is highly porous.

Example 20

A quantity of the 600 oersted coercivity powder as described in claim 1 and being comprised of 60% cobalt, 20% iron and 20% nickel was measured to have a magnetic moment of 140 gauss in its powder form.

This material was then smeared out vigorously with a linseed oil. A drop of linseed oil was placed on a glass surface 1 gram of metal powder was incrementally added to the linseed oil and kneaded with a spatula. Enough oil and powder was added alternately to maintain a stiff metal-like strip on the plate as the powder is broken down. As a stiff paste in linseed oil, it manifested a magnetic moment of 1100 gauss.

Next, a sample of the original powder material was dispersed in magnetic tape with about 15% of its weight of cobalt-doped iron oxide being subjected to compounding with matrix resins in a sigma blade mixer. The mix containing about 25% by weight of pigment was charged into a glass tube, oriented in a 60-cycle BH meter and found to have a magnetic moment of 4500 oersteds; and a squareness of 0.86. (The original powder had a squareness of about 0.6.)

The increasing magnetic moments are indicative of the decreased bulk density of the material as it is broken up by the relatively mild shearing actions described. The increased squareness indicates that smaller particles, more acicular in nature are formed during the shearing procedures.

The total increase in bulk density achieved by these techniques is typically from 10 to 150 times; it is usually in excess of 30 times the original bulk density.

That little damage is done to a magnetic recording powder by these shearing action is demonstrated by the facts that the processing procedure does not increase coercivity less than about 10% and there is no substantial increase into strain anisotropy introduced into the powder.

Example 21

A quantity of 100 grams of stannous sulfate was dissolved in 400 ml of deionized water. A second solution was prepared by dissolving, in a 1500 ml baffled Erlenmeyer flask, 126 grams of oxalic acid dihydrate in 800 ml of deionized water equipped with a magnetic stirring bar. The stannous solution was added dropwise. The resulting precipitate was filtered on a Buchner funnel, washed with 1500 ml of hot water and then with 500 ml of acetone. A sample of the dry oxalate was placed in a tube furnace and fired at 500° F. in 3% $O_2$, and 97% $N_2$. This material was then cooled to room temperature, exposed to dry air for 30 minutes and withdrawn for analysis. The oxide was very light brown in color, it was $SnO_2$. The surface area was found to be 43 square meters/gram and the bulk density was 0.085 g/cc. The probes of a 10,000 OHM per volt multimeter were placed in the powder about 3 inches apart. The powder was found to be electrically conductive.

One gram of this powder was mixed with 1.5 g silastic caulking compound and extruded through a syringe. This material was air cured. The ribbon was also found to conduct electricity extremely well in view of the small volume of metal in the composition.

A second sample of the oxalate was fired in a tube furnace at 850° F. in nitrogen to produce a black powder of 0.071 g/cc bulk density and 19 square meters per gram of surface area. This material was SnO and was not electrically conductive.

What is claimed is:

1. A process for making ferromagnetic particles comprising the steps of
   (1) taking a powder characterized with a ratio of (1) the bulk density of the mass to (2) specific gravity of the material from which the powder is formed up to about 0.08; and wherein said particles are highly porous and characterized by a surface area in excess of 5 meters$^2$ per gram
   (2) comminuting it to a particle having a magnetic particle size of less than 500 angstroms,
said comminuting step being sufficiently mild that the coercive force change is less than 10% during said step.

2. A process of making metal-bearing catalysts comprising of the steps
   (1) taking an organometallic salt mass of a first metal adapted for decomposition to a metal oxide catalytic support and of a second metal adapted for decomposition to a catalytic metal
   (2) decomposing said organometallic salt to form a matrix of the oxide of said first metal on which is distributed minute masses of said second metal.

3. A process as defined in claim 2 wherein said salt mass comprises a salt formed with both first and second metals minute masses of said second metal are below 150 angstroms in average size.

4. A process as defined in claim 2 wherein said minute masses of said second metal are substantially super paramagnetic.

5. A catalyst comprising a matrix of an oxide of a metal and, intimately dispersed and spaced throughout said matrix, in masses of less than about 150 angstroms, in average diameter, a catalytic metal.

6. A catalyst as defined in claim 5 wherein said catalyst is substantially super paramagnetic.

7. A catalyst as defined in claim 5 wherein said metal comprises at least 5% of cobalt metal.

8. A catalyst as defined in claim 5 comprising an effective pore size of above 25 angstroms and a bulk density of less than about 0.4 grams per cc.

9. A catalyst as defined in claim 6 comprising an effective pore size of above 25 angstroms and a bulk density of less than about 0.4 grams per cc.

10. A catalyst as defined in claim 7 comprising an effective pore size of above 25 angstroms and a bulk density of less than about 0.4 grams per cc.

11. A catalyst as defined in claim 6 wherein said oxide is alumina.

12. A catalyst formed of a metal as defined in claim 5, said metal comprising a cobalt-bearing alloy.

13. A process as defined in claim 2 wherein said matrix is an inorganic particulate product comprising a mass of porous powder particles, said product material characterized by a ratio of
    (1) the bulk density of the mass to
    (2) specific gravity of the material from which the powder is formed is up to about 0.08; and wherein said particles are highly porous and characterized by a surface area in excess of 5 meters$^2$ per gram, and an effective pore size of greater than 25 angstroms.

14. A process as defined in claim 13 wherein said matrix is characterized by an effective pore size of between 25 to 200 angstroms in diameter and comprises a surface area of at least 25 square meters per gram.

15. A process as defined in claim 2 wherein said metal comprises cobalt, and has a surface area of at least 5 square meters per gram.

16. A catalyst as defined in claim 5 wherein said metal comprises an alloy as a metal component thereof.

17. A catalyst as defined in claim 16 wherein said metal comprises a major quantity of nickel and a minor quantity of cobalt.

18. A catalyst as defined in claim 16 wherein said catalytic metal is a cobalt-bearing alloy.

19. A catalyst as defined in claim 16 wherein said catalytic metal comprises nickel.

20. A catalyst as defined in claim 18 wherein said catalytic metal comprises a cobalt-nickel-containing alloy.

21. A catalyst as defined in claim 19 wherein said oxide is a member selected from the group consisting of alumina, magnesia, cerium oxide, oxides of a rare earth, zinc oxide, calcium oxide, or a combination of said members.

22. A catalyst as defined in claim 5 wherein said material is constructed of particles having
 (1) a nuclei of a first metal oxide material and
 (2) a metal-bearing oxide material relatively rich in metal on the exterior surface thereof.

23. A catalyst as defined in claim 6 wherein said material is constructed of particles having
 (1) a nuclei of a first metal oxide material and
 (2) a metal-bearing oxide material relatively rich in metal on the exterior surface thereof.

24. A powder product as defined in claim 8 wherein said material is constructed of particles having
 (1) a nuclei of a first metal oxide material and
 (2) a metal-bearing oxide material relatively rich in metal on the exterior surface thereof.

25. A powder product as defined in claim 20 wherein said material is constructed of particles having
 (1) a nuclei of a first metal oxide material and
 (2) a metal-bearing oxide material relatively rich in metal on the exterior surface thereof.

* * * * *

UNITED STATES PATENT AND TRADEMARK OFFICE
CERTIFICATE OF CORRECTION

PATENT NO. : 4,146,504
DATED : March 27, 1979
INVENTOR(S) : Robert J. Deffeyes

It is certified that error appears in the above-identified patent and that said Letters Patent are hereby corrected as shown below:

Column 18, line 15: Change "$H_9$" to --$H_c$--

[SEAL]

Signed and Sealed this

Thirty-first Day of July 1979

Attest:

Attesting Officer

LUTRELLE F. PARKER
*Acting Commissioner of Patents and Trademarks*